United States Patent
Fujita

(10) Patent No.: US 7,666,814 B2
(45) Date of Patent: Feb. 23, 2010

(54) SOIL CONDITIONER

(75) Inventor: Koji Fujita, Chiba (JP)

(73) Assignee: Nippon Sheet Glass Company, Limited, Tokyo (JP)

(*) Notice: Subject to any disclaimer, the term of this patent is extended or adjusted under 35 U.S.C. 154(b) by 113 days.

(21) Appl. No.: 10/547,629

(22) PCT Filed: Mar. 1, 2004

(86) PCT No.: PCT/JP2004/002515

§ 371 (c)(1),
(2), (4) Date: Apr. 12, 2006

(87) PCT Pub. No.: WO2004/078374

PCT Pub. Date: Sep. 16, 2004

(65) Prior Publication Data

US 2006/0213324 A1    Sep. 28, 2006

(30) Foreign Application Priority Data

Mar. 3, 2003    (JP) .............................. 2003-055905

(51) Int. Cl.
*B01J 20/14* (2006.01)

(52) U.S. Cl. .................. 502/412; 71/903; 502/400; 502/407

(58) Field of Classification Search .......... 71/903; 502/412

See application file for complete search history.

(56) References Cited

U.S. PATENT DOCUMENTS

| | | | | |
|---|---|---|---|---|
| 3,735,734 A | * | 5/1973 | Pierce et al. ............ | 119/173 |
| 3,873,487 A | * | 3/1975 | Minato et al. ............ | 523/132 |
| 4,334,905 A | * | 6/1982 | Wagner et al. ............ | 71/27 |
| 4,405,354 A | * | 9/1983 | Thomas et al. ............ | 71/21 |
| 5,013,349 A | * | 5/1991 | Tanaka ................... | 71/27 |
| 5,780,001 A | | 7/1998 | Khare | |
| 5,958,830 A | * | 9/1999 | Khare et al. ............ | 502/407 |
| 6,150,300 A | * | 11/2000 | Khare et al. ............ | 502/407 |
| 6,426,113 B1 | * | 7/2002 | Daniels ................ | 426/654 |

FOREIGN PATENT DOCUMENTS

| | | |
|---|---|---|
| CN | 1162586 | 10/1997 |
| JP | 52-149857 A | 12/1977 |
| JP | 61-171537 A | 8/1986 |
| JP | 61-187931 A | 8/1986 |
| JP | 3-504827 A | 10/1991 |
| JP | 05161845 | * 6/1993 |
| JP | 7-204501 A | 8/1995 |
| JP | 2000-24647 A | 1/2000 |
| JP | 2001-200236 A | 7/2001 |

OTHER PUBLICATIONS

Office action of May 23, 2008 in corresponding Chinese application 2004800113362 with English translation. Office action in corresponding Indian Application 2122CHENP/2005.

* cited by examiner

*Primary Examiner*—Wayne Langel
(74) *Attorney, Agent, or Firm*—Fulbright & Jaworski, L.L.P.

(57) ABSTRACT

A soil conditioner is provided that can clean and improve soil by effectively adsorbing harmful substances, even if it is soil with a lot of underground water, through efficient use of as little adsorbent of harmful substances as possible. The soil conditioner is made by mixing an adsorbent of harmful substances and a water absorbing substance, and shaping the mixture into granular shape.

2 Claims, 2 Drawing Sheets

| Exp. Ex. | soil conditioner sample | used amount | arsenic adsorption ratio |
|---|---|---|---|
| 1 | cerium hydroxide | 2g | about 100% |
| 2 | cerium oxide | 2g | 17.0% |
| 3 | diatomaceous earth baked at 750°C | 5g | 8.1% |
| 4 | diatom. earth + waste glass abrasive (cerium oxide + other substances), baked at 750°C | 5g | 63.0-70.0% |
| 5 | diatom. earth + waste glass abrasive (cerium oxide + other substances), baked at 1000°C | 5g | 0.8% |
| 6 | diatom. earth + waste glass abrasive (cerium oxide + other substances), dried at 80°C | 5g | 60.0-70.0% |
| 7 | diatom. earth + waste glass abrasive (cerium hydroxide + other substances), dried at 80°C | 5g | 99.9% |
| 8 | diatom. earth + cerium hydroxide, baked at 700°C | 5g | 99.0% |

| Exp. Ex. | soil conditioner sample | used amount | arsenic adsorption ratio |
|---|---|---|---|
| 1 | cerium hydroxide | 2g | about 100% |
| 2 | cerium oxide | 2g | 17.0% |
| 3 | diatomaceous earth baked at 750°C | 5g | 8.1% |
| 4 | diatom. earth + waste glass abrasive (cerium oxide + other substances), baked at 750°C | 5g | 63.0-70.0% |
| 5 | diatom. earth + waste glass abrasive (cerium oxide + other substances), baked at 1000°C | 5g | 0.8% |
| 6 | diatom. earth + waste glass abrasive (cerium oxide + other substances), dried at 80°C | 5g | 60.0-70.0% |
| 7 | diatom. earth + waste glass abrasive (cerium hydroxide + other substances), dried at 80°C | 5g | 99.9% |
| 8 | diatom. earth + cerium hydroxide, baked at 700°C | 5g | 99.0% |

Fig. 1

SOIL CONDITIONER

This is a §371 of PCT/JP2004/002515 filed Mar. 1, 2004, which claims priority from Japanese Patent Application No: 2003-55905 filed Mar. 3, 2003.

TECHNICAL FIELD

The present invention relates to soil modifiers for cleaning and improving soil that has been contaminated by harmful substances, such as chemicals.

BACKGROUND ART

Various methods for cleaning contaminated soil have been proposed and implemented in the past, starting with excavating the contaminated soil and replacing it with new soil, but overall they are elaborate and require considerable costs to improve the soil.

In this regard, methods using soil conditioners are comparatively simple and also inexpensive, and can reduce the content of harmful substances below the regulatory values by adsorbing the harmful substances by mixing a soil conditioner into the soil.

Conventionally, almost all soil conditioners used for such methods were produced only from adsorbents of harmful substances (cerium or lanthanum hydrates or the like) serving as the main ingredient (see for example, JP 2001-200236A).

Thus, since almost all conventional soil conditioners are produced only from the adsorbents of harmful substances serving as the main ingredient, they have the disadvantage that their soil improving effect is poor considering that relatively expensive adsorbents of harmful substances are used in large amounts.

In particular in soils with a lot of underground water, the above-mentioned disadvantage is clearly noticeable, because harmful substances such as heavy metals are eluted and drained out, so that there is a need for improvement of this aspect.

The present invention addresses this aspect, and it is an object thereof to provide a soil conditioner that can clean and improve soil by effectively adsorbing harmful substances, even if it is soil with a lot of underground water, through efficient use of as little adsorbent of harmful substances as possible.

DISCLOSURE OF THE INVENTION

A first characteristic configuration of the present invention is a soil conditioner made by mixing an adsorbent of harmful substances and a water absorbing substance, and shaping the mixture into granular shape.

With this first characteristic configuration of the present invention, the soil conditioner is made by mixing adsorbent of harmful substances and a water absorbing substance and shaping the mixture, so that the water absorbing substance absorbs water, and the adsorbent of harmful substances adsorbs harmful substances in the absorbed water, and consequently, it is possible to clean soil by reliably adsorbing harmful substances diluted in underground water, even if it is soil with a lot of underground water.

Moreover, since the soil conditioner is granular, there are few clumps and clods when mixed into the soil, as may happen in the case of a fine powder for example, and the soil conditioner can be admixed uniformly across the entire soil, and as becomes clear from the following experimental results, it can clean and improve the soil by effectively adsorbing harmful substances, even if it is soil with a lot of underground water, by efficiently using a small amount of an adsorbent of harmful substances.

In a second characteristic configuration of the present invention, the water absorbing substance comprises diatomaceous earth.

With this second characteristic configuration of the present invention, the water absorbing substance that is mixed into the soil conditioner comprises diatomaceous earth, so that it is possible to cut the costs of the soil conditioner by using diatomaceous earth, which is relatively inexpensive and has excellent water absorbency. Moreover, in addition to its water absorbency, diatomaceous earth has suitable water permeability, so that harmful substances can be adsorbed comparatively thoroughly by the adsorbent of harmful substances across the entire soil, and it is possible to clean and improve the soil by using a small amount of adsorbent of harmful substances more effectively.

In a third characteristic configuration of the present invention, the adsorbent of harmful substances comprises a rare earth compound.

With this third characteristic configuration of the present invention, the adsorbent of harmful substances comprises a rare earth compound, so that if the harmful substance is arsenic, fluorine, chromium, cadmium or lead or the like, then it has an adsorption capability of about four to six times that of alumina, which was used conventionally, and consequently it is possible to clean and improve the soil by using an even smaller amount of adsorbent of harmful substances more effectively.

In a fourth characteristic configuration of the present invention, the rare earth compound is cerium hydroxide or cerium oxide hydrate.

With this fourth characteristic configuration of the present invention, the rare earth compound is cerium hydroxide or cerium oxide hydrate, so that of the above-noted harmful substances, its adsorption capability of arsenic, lead and the like is particularly high, and, moreover, cerium is a rare earth that can be obtained comparatively cheaply, so that it is also advantageous with regard to cost.

In a fifth characteristic configuration of the present invention, the adsorbent of harmful substances comprises cerium hydroxide, and after mixing and granulating the adsorbent of harmful substances comprising cerium hydroxide and the water absorbent substance comprising diatomaceous earth, the mixture is dried and shaped at a temperature of not greater than 1100° C.

With this fifth characteristic configuration of the present invention, the adsorbent of harmful substances comprises cerium hydroxide, and after mixing and granulating the adsorbent of harmful substances comprising cerium hydroxide and the water absorbent substance comprising diatomaceous earth, the mixture is dried and shaped at a temperature of not greater than 1100° C., so that, as becomes clear from the experimental results below, a soil conditioner having excellent adsorption capability of harmful substances, such as arsenic and lead in particular, can be provided inexpensively.

In a sixth characteristic configuration of the present invention, a used waste glass abrasive including cerium oxide is used as the adsorbent of harmful substances.

With this sixth characteristic configuration of the present invention, a used waste glass abrasive including cerium oxide is used as the adsorbent of harmful substances, so that a soil conditioner having excellent adsorption capability of harmful substances, such as arsenic and lead in particular, can be provided inexpensively by effectively reusing the waste material generated by abrasion processing of glass.

In a seventh characteristic configuration of the present invention, cerium oxide in the waste glass abrasive is modified into cerium hydroxide and used as the adsorbent of harmful substances.

With this seventh characteristic configuration of the present invention, cerium oxide in the waste glass abrasive is modified into cerium hydroxide and used as the adsorbent of harmful substances, so that, as becomes clear from the following experimental results, a soil conditioner in which the adsorption ratio for arsenic and the like is considerably improved and that has even better adsorption capability compared to the case that the waste glass abrasive is used unmodified can be provided inexpensively.

BRIEF DESCRIPTION OF DRAWINGS

FIG. 1 is a table showing the experimental results for confirming efficacy.

BEST MODE FOR CARRYING OUT THE INVENTION

Figure 2:
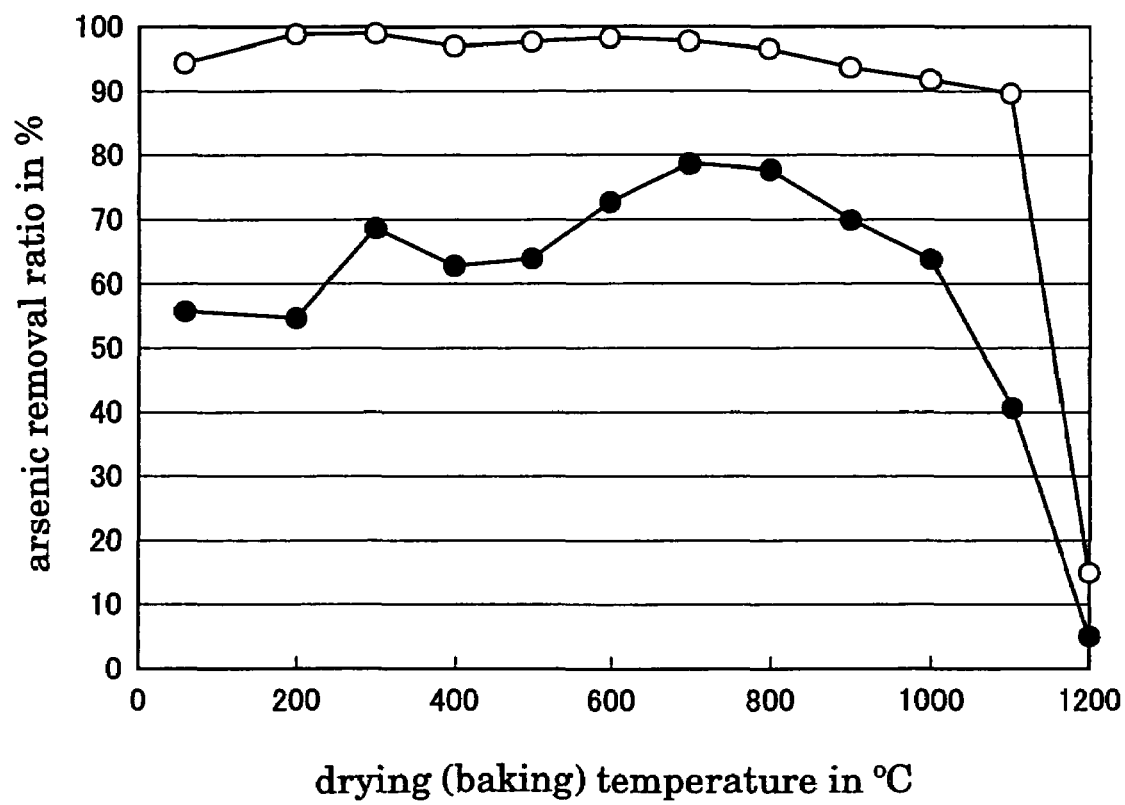
FIG. 2 is a graph showing the experimental results for drying (baking) temperature and arsenic removal ratio.

The soil conditioner according to the present invention uses, as an adsorbent of harmful substances, a rare earth compound, more specifically one or two or more compounds of rare earths selected from cerium (Ce), samarium (Sm), neodymium (Nd), gadolinium (Gd), lanthanum (La) and yttrium (Y).

Such rare earth compounds have a high adsorption capability with respect to arsenic (Ac), fluorine (F), chromium (Cr), cadmium (Cd), lead (Pb) and other harmful substances included in the soil.

These rare earth compounds are used in the form of hydrates or hydroxides of rare earth oxides, in the form of, for example, cerium oxide hydrate ($CeO_2.1.6\ H_2O$), samarium oxide hydrate ($Sm_2O_3.4.1\ H_2O$), neodymium oxide hydrate ($Nd_2O_3.4.7\ H_2O$), gadolinium oxide hydrate ($Gd_2O_3.5.0\ H_2O$), lanthanum oxide hydrate ($La_2O_3.3.0\ H_2O$), yttrium oxide hydrate ($Y_2O_3.2.1\ H_2O$), or cerium hydroxide ($Ce(OH)_3$ or $Ce(OH)_4$), and in the form of a fine powder. The main ingredient of the soil conditioner is an adsorbent of harmful substances that is made of such rare earth compound(s) and is produced by admixing a water absorbing substance thereto.

Moreover, since abrasives for glass used to abrade glass contain cerium oxide, and still contain cerium oxide even after abrading glass, it is possible to reuse used waste glass abrasives as adsorbents for harmful substances.

Used waste glass abrasives also include glass powder or the like, but when mixed with the water absorbing substance and pelletized into granules, this glass powder acts as a binder, so that there is the advantage that it is very easily shaped into granules.

Moreover, when using a waste glass abrasive as the adsorbent for harmful substances, it is advantageous to modify the cerium oxide in the waste glass abrasive into cerium hydroxide, and use this modified waste glass abrasive as the adsorbent for harmful substances, as becomes clear from the experimental results noted below. In any case, the soil conditioner's principal component may be an adsorbent of harmful substances made of waste glass abrasive, produced by admixing a water absorbing substance thereto.

For the water absorbing substance, it is possible to use diatomaceous earth, whose main ingredient is silicon oxide ($SiO_2$), active carbon, shirasu microballoons, peat, pumice or the like, used in the form of granules. Among these water absorbing substances, diatomaceous earth, which has excellent water absorbency and water permeability and is comparatively inexpensive, is particularly preferable.

Then, after this granular water absorbing substance and the rare earth compound or the waste glass abrasive serving as the adsorbent for harmful substances have been sufficiently mixed by a rotary mixer or the like, and pelletized into granules of about 2 mm diameter by a pelletizer, they are dried and shaped to produce the soil conditioner.

The soil conditioner according to the present invention was subjected to various experiments to confirm efficacy, and the following addresses some of them.

For example, an aqueous solution of 2.5 mg arsenic mixed into 25 mL of water was prepared, and various soil conditioners according to the present invention were given into this aqueous solution and shaken for 30 min, and after that, the residual amount of arsenic in the aqueous solution was measured, and the arsenic adsorption for the various soil conditioners was calculated from the residual arsenic amount and the amount of arsenic that was introduced.

For comparison, also the adsorption ratio of serium hydroxide alone and the adsorption ratio cerium oxide alone was calculated under the same conditions, and also the adsorption ratio of diatomaceous earth alone was calculated.

The results of this are listed in the table in FIG. 1.

In the table in FIG. 1, Experimental Example 1 shows the arsenic adsorption ratio for the case that 2 g of cerium hydroxide alone is used, Experimental Example 2 for the case that 2 g of cerium oxide alone is used, and Experimental Example 3 for the case that 5 g of diatomaceous earth (baked at 750° C.) alone is used.

From the Experimental Examples 1 to 3, it can be seen that, of cerium hydroxide and cerium oxide, cerium hydroxide has by far the better adsorptive effect, that cerium oxide alone has no great adsorptive effect, and that also diatomaceous earth alone has almost no adsorptive effect.

In Experimental Examples 4 to 6, 5 g soil conditioner was used that was produced by mixing 90 wt % of diatomaceous earth and 10 wt % of waste glass abrasive, and the 10 wt % of waste glass abrasive included 3 wt % cerium oxide and 7 wt % other substances (such as glass powder).

Experimental Example 4 shows the arsenic adsorption ratio for the case that the pelletized soil conditioner was baked at 750° C., Experimental Example 5 for the case that it was baked at 1000° C., and Experimental Example 6 for the case that it was dried at 80° C.

From the results of Experimental Examples 4 to 6, it can be seen that the case of baking at 750° C. and the case of drying at 80° C. show a much higher adsorption ratio than in the case of cerium oxide alone. However, in the case of drying at 80° C., there is the disadvantage that the soil conditioner itself is somewhat brittle.

For the case of baking at 1000° C., it can be seen that hardly any adsorptive effect can be expected. Regarding this point, it was confirmed by other experiments that the adsorption ratio changes dramatically at a baking temperature of around 900° C., and consequently, it is necessary to set the temperature to less than 900° C. if baking.

Moreover, in Experimental Example 7, 5 g of a soil conditioner is used that was produced by mixing 50 wt % of diatomaceous earth with 50 wt % of waste glass abrasive.

However, the waste glass abrasive used in Experimental Example 7 is different from the waste glass abrasive used in Experimental Examples 4 to 6, in that the cerium oxide contained in the abrasive has been modified into cerium hydroxide, and this modified substance is used, and therefore, the 50 wt % of the waste glass abrasive contain 8 wt % of cerium hydroxide and 42 wt % of other substances (such as glass powder) after the modification.

Moreover, after pelletization it is dried at 80° C., and even though the amount of cerium hydroxide is much smaller, it exhibits a very high adsorption ratio that is about the same as that of the cerium hydroxide alone in Experimental Example 1.

Moreover, in Experimental Example 8, 5 g of a soil conditioner was used that was produced by mixing 50 wt % of diatomaceous earth and 50 wt % of cerium hydroxide, and baked at 700° C. after pelletization, and also this experimental example showed a very high adsorption ratio.

Otherwise, the relation between the drying (baking) temperature of the soil conditioner and the arsenic removal ratio was confirmed experimentally and those experimental results are shown in FIG. 2.

In FIG. 2, the black circles are the results for a beaker test, and the white circles are the results for a filter test.

In the beaker test, soil conditioners were prepared that were produced by mixing 50 wt % of diatomaceous earth and 50 wt % of cerium hydroxide, for varying temperatures of the drying (baking) after the pelletization, and from an aqueous solution obtained by mixing 100 mg of arsenic into 1 L of water, 25 mL were divided into widemouthed bottles made of PE, 5 g of each soil conditioner was given into the divided aqueous solutions, and after shaking for 30 min, filtered with filter paper, diluted by a factor five and measured.

In the filter test, the same soil conditioners as in the beaker test were used, and with an arsenic removal ratio as when passing water with an arsenic concentration of 0.1 mg/L at 1000 ton/day through 1 $m^2$ of each soil conditioner, it can be said that these are experimental results for an environment that is very close to the ordinary environment of usage.

From the experimental results in FIG. 2, it can be seen that in both the beaker test and in the filter test, the arsenic removal ratio drops sharply when the baking temperature exceeds 1100° C.

Consequently, if cerium hydroxide is used as the adsorbent for harmful substances, and diatomaceous earth is used as the water absorbing substance, it is necessary to perform drying (baking) shaping at temperatures below 1100° C.

Other Embodiments

In the foregoing embodiment, an example was shown, in which a rare earth compound was used as the adsorbent for harmful substances, but it is also possible to use for the adsorbent of harmful substances a substance other than rare earth compounds, such as hydrous zirconium oxide, hydrous titanium oxide, hydrous iron oxide, manganese oxide or alumina, in accordance with the soil to be treated.

Moreover, also the mixing ratio of the adsorbent of harmful substances and the water absorbing material can be changed as appropriate for the properties of the soil to be treated.

INDUSTRIAL APPLICABILITY

Soil that has been contaminated by various kinds of harmful substances, such as chemicals, can be cleaned, and the cleaned soil can be reused for various purposes.

The invention claimed is:

1. A method of making a soil conditioner, comprising mixing and granulating (i) an adsorbent of harmful substances wherein the adsorbent comprises cerium hydroxide or cerium oxide hydrate, and (ii) a water absorbing substance comprising diatomaceous earth.

2. The method according to claim 1, comprising mixing and granulating the adsorbent of harmful substances and the water absorbing substance to form a mixture, and drying and shaping the mixture at a temperature of 1100° C. or less.

* * * * *